Nov. 18, 1941. A. E. CARLSTROM 2,262,795
TRAP NEST
Filed March 5, 1938 4 Sheets-Sheet 1

Inventor
Axel E. Carlstrom,
By
Attorneys

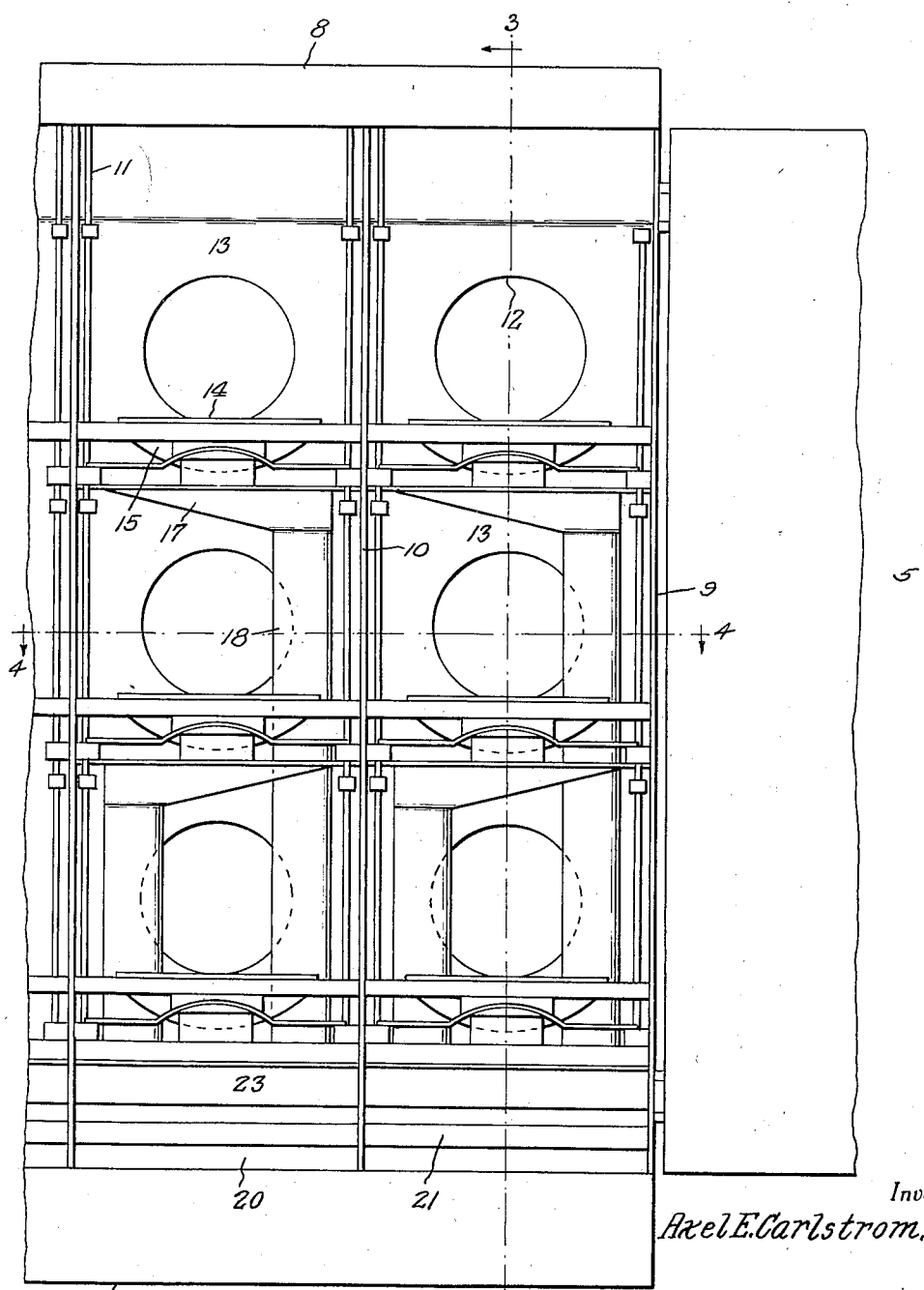

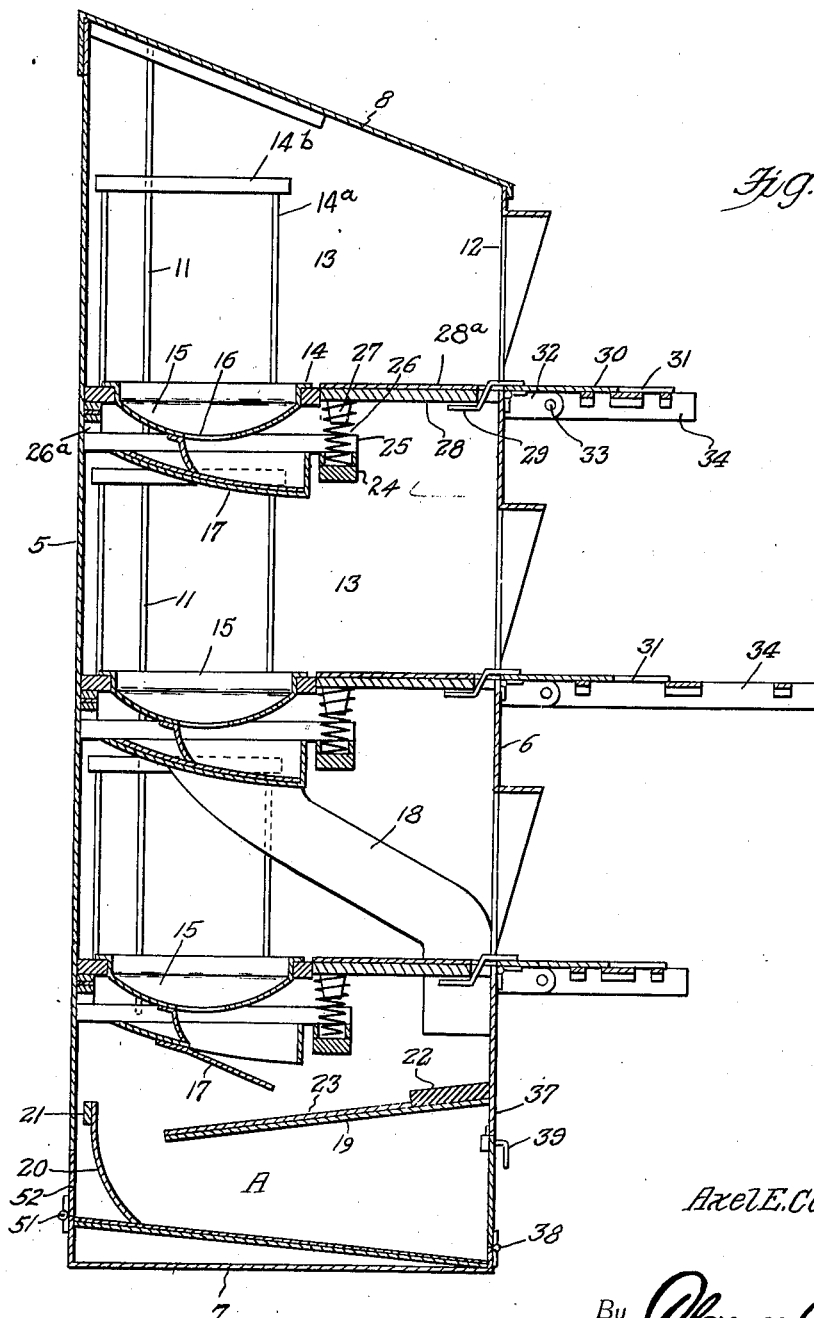

Nov. 18, 1941.   A. E. CARLSTROM   2,262,795
TRAP NEST
Filed March 5, 1938   4 Sheets-Sheet 4
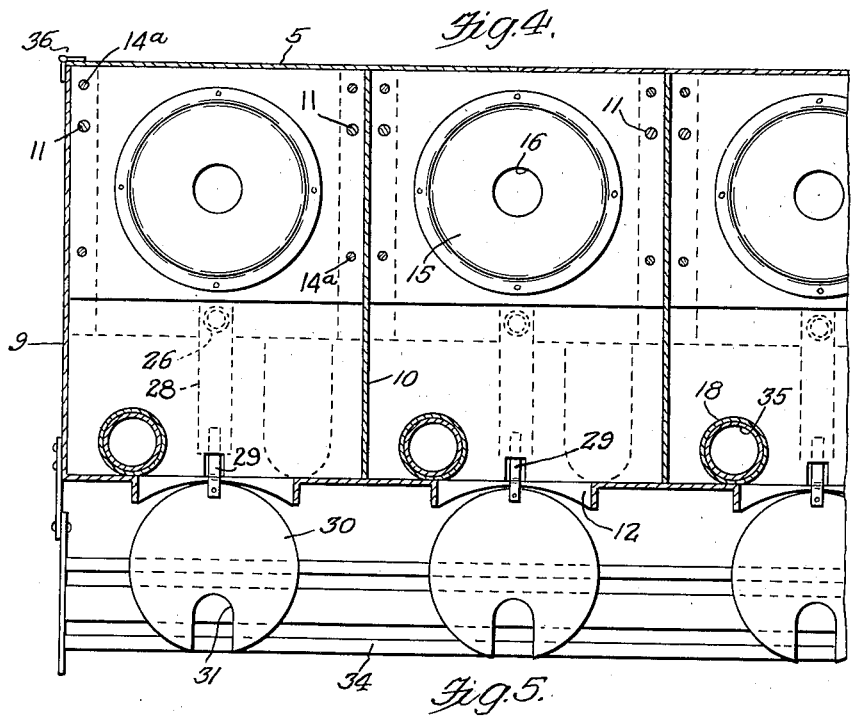
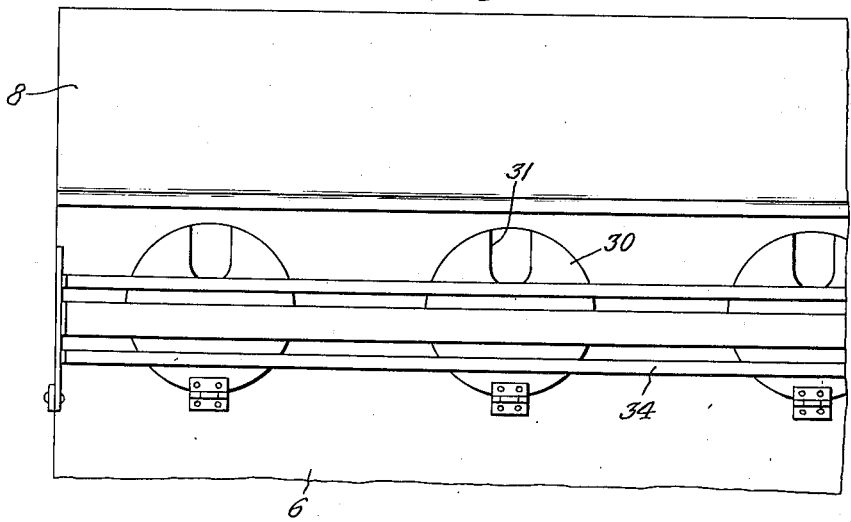
Inventor
Axel E. Carlstrom,
By Clarence A. O'Brien
Hyman Berman
Attorneys Patented Nov. 18, 1941

2,262,795

UNITED STATES PATENT OFFICE 2,262,795

TRAP NEST

Axel E. Carlstrom, Chicago, Ill.

Application March 5, 1938, Serial No. 194,163

2 Claims. (Cl. 119—47)

This invention appertains to new and useful improvements in trap nests, more particularly to a trap nest constructed to operate automatically.

The principal object of the present invention is to provide a trap nest apparatus wherein a hen controls the nest closure incident to its entrance and exit with respect to the nest.

Another important object of the invention is to provide a trap nest wherein the eggs will be protected against thieves and against damage.

The various other important objects and advantages of the invention will become apparent to a reader of the following specification.

In the drawings,

Figure 1 presents a front elevational view.

Figure 2 represents a fragmentary rear elevational view of the structure with the back in open position.

Figure 3 is a vertical sectional view on line 3—3 of Figure 2.

Figure 4 is a fragmentary horizontal sectional view on line 4—4 of Figure 2.

Figure 5 is a fragmentary front elevational view of the nest closure and roost in upright position.

Figure 1:
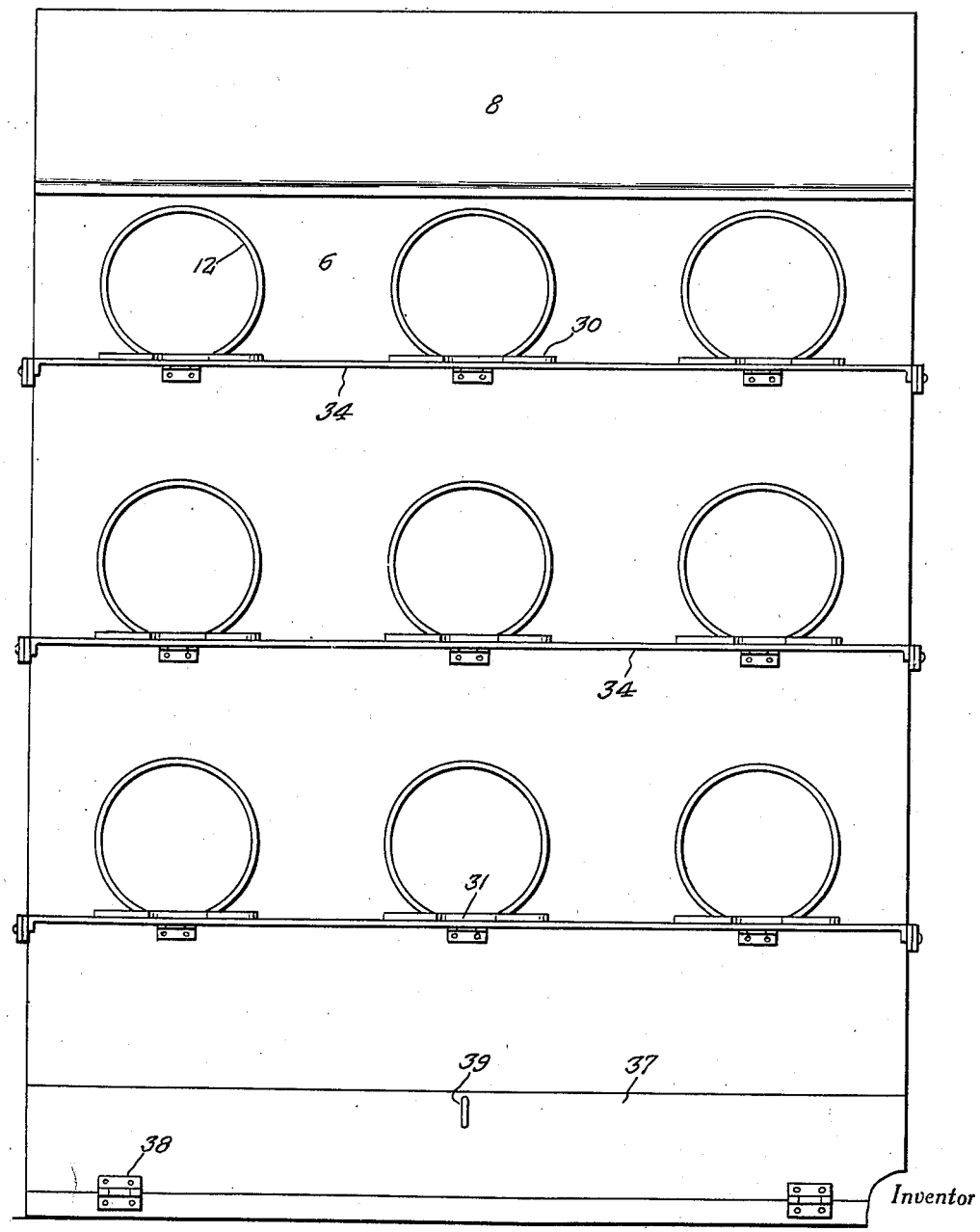

Referring to the drawings, wherein like numerals designate like parts, it can be seen that the nest apparatus consists of the back wall 5, the front wall 6, the bottom wall 7 and the inclined top wall 8, as well as the end walls 9 and the vertical partitions 10 which divide the interior of the house in conjunction with the hen nests into a plurality of tiers of nests. The front wall 6 is provided with an opening 12 in front of each nest compartment 13 and in each of these compartments 13 is a movable nest frame 14 which has a concaved nest 15 supported therein, this nest 15 having a central opening 16 for the exit of a laid egg. Underlying each of the nests 15 is a felt lined trough 17 and from each of these troughs 17 a chute 18 leads downwardly to terminate in the collecting compartment A.

In this compartment A is the stop plate 19 which inclines from the front wall 6 inwardly to terminate in spaced relation from the flap 20 which depends from the horizontal bar 21. A cushion rubber strip 22 on the upper portion of the plate 19 extends under each of the chutes 18 at its discharge end, the remaining portion of the plate 19 having a rubber or felt covering 23. As can be seen in Figure 3, at the lower end of the back wall 5 a door 52 hinged as at 51 is provided to permit entrance to the lower portion of the apparatus so that access can be had to the buffer flap 20 as in instances where this should be adjusted or replaced when it becomes mutilated from wear.

As can be seen in Figure 3, the rods 14a rise from the frame 14 and have their cross members 14b apertured to receive the guide rods 11. The guide rods 11 also extend through side portions of the movable frame 14.

In normal spaced relation under each of the frames 14 is a stationary frame 25 in which the corresponding felt lined trough 17 is mounted. The forward portion of each of these stationary frames 25 is provided with a socket structure 24 for receiving the lower portion of a compression spring 26, the upper portion of which circumscribes a nipple 27 depending from a corresponding plate 28, which plate is suitably secured to move with the frame 14. As can be seen in Figure 3, the forward edge of this plate 28 rests upon the inner end of an arm 29 which projects inwardly in an offset manner from the corresponding door 30. Above each plate 28, is a stationary floor 28a.

It can also be seen that the frame 14 is further supported by the leaf spring 26a bridging the rear portion of the frame 25.

The springs 26 and 26a serve to normally maintain the plate 28 and frame 14 elevated so that the door 30 can assume the position shown in Figure 3, this door being formed with a neck opening 31 through which the fowl will have ventilation and some light.

Arms 32 extend outwardly from the front wall 6 and have pivotally secured thereto as at 33, roosts 34 which can be swung upwardly against the closed closures 30 whenever desired, and as shown in Figure 5.

As can be seen in Figure 4, the chutes 18 are provided with felt linings 35 and the rear wall 5 is hingedly secured to one end wall 9 as at 36.

As can be seen in Figure 3, a door 37 is hingedly secured in place as at 38 below the front wall 6, and is provided with a lock 39. Thus access can be obtained to the interior of the compartment A.

In the operation of the apparatus, a fowl to use one of the nests, will alight on the door 30. The fowl will walk into the compartment 13 over the stationary floor 28a. When the fowl sits upon the nest 15 the frame 14 will descend, carrying with it the plate 28, which acting on the lever 29 will swing the door to a closed position and thus the fowl will be confined in semi-darkness and to the exclusion of other fowls until the egg-laying feat is completed, whereupon the fowl will step onto the floor 28a, releasing its weight from the nest 15 and frame 14, to the end that the springs 26 and 26a will lift the plate 28 and frame 14, releasing the door 30 so that the door can gravitate to the open position or be pushed to this position, as shown in Figure 3.

While the foregoing specification sets forth the invention in specific terms, it is to be understood that numerous changes in the shape, size and materials may be resorted to without departing from the spirit and scope of the invention as claimed hereinafter.

Having described the invention, what is claimed is—

1. A trap nest comprising an enclosure having a fowl entrance opening therein, a door for the opening, a floor extending inwardly from the open portion of the enclosure and terminating forwardly of the rear portion of the enclosure, said floor being stationarily fixed in the enclosure, a nest frame in the enclosure and when unoccupied being on substantially a common plane with the floor, a member extending toward the open portion of the enclosure from the frame, said door having a lever extending inwardly of the enclosure and against which the member is adapted to press when weight is imposed on the nest frame, a nest for the frame, and spring means for normally holding the member elevated against the floor with the nest frame disposed substantially flush with the floor.

2. A trap nest comprising an enclosure having a fowl entrance opening therein, a door for the opening, a floor extending inwardly from the open portion of the enclosure and terminating forwardly of the rear portion of the enclosure, said floor being stationarily fixed in the enclosure, a nest frame in the enclosure and when unoccupied being on substantially a common plane with the floor, a member extending toward the open portion of the enclosure from the frame, said door having a lever extending inwardly of the enclosure and against which the member is adapted to press when weight is imposed on the nest frame, a nest for the frame, and spring means for normally holding the member elevated against the floor with the nest frame disposed substantially flush with the floor, and vertically disposed guide rods for the nest frame.

AXEL E. CARLSTROM.